United States Patent [19]

Duffy

[11] 4,063,490
[45] Dec. 20, 1977

[54] RACK AND PINION POWER STEERING GEAR MECHANISM

[75] Inventor: James J. Duffy, Livonia, Mich.

[73] Assignee: Ford Motor Company, Dearborn, Mich.

[21] Appl. No.: 656,682

[22] Filed: Feb. 9, 1976

Related U.S. Application Data

[63] Continuation-in-part of Ser. No. 505,884, Sept. 13, 1974, abandoned.

[51] Int. Cl.² ............................................. F15B 13/04
[52] U.S. Cl. ................................. 91/467; 91/375 A; 92/163; 92/166; 92/167
[58] Field of Search ............... 91/375 A, 467; 92/166, 92/169, 167, 163; 277/30; 180/148

[56] References Cited

U.S. PATENT DOCUMENTS

| | | | |
|---|---|---|---|
| 380,488 | 4/1888 | Jarvis | 92/167 |
| 1,747,968 | 2/1930 | Braren | 92/167 X |
| 2,858,802 | 11/1958 | Parsons et al. | 92/163 |
| 3,005,669 | 10/1961 | Nunnemacher | 92/168 X |
| 3,037,485 | 6/1962 | Adams | 92/166 |
| 3,145,626 | 8/1964 | Vickers et al. | 91/375 A |
| 3,624,802 | 11/1971 | Ripert | 92/167 X |
| 3,680,443 | 8/1972 | Jenvey | 91/375 A |
| 3,746,045 | 7/1973 | Bunker et al. | 91/375 A |
| 3,817,155 | 6/1974 | Walter | 92/167 |

FOREIGN PATENT DOCUMENTS

| | | | |
|---|---|---|---|
| 979,377 | 1/1965 | United Kingdom | 180/148 |

Primary Examiner—Irwin C. Cohen
Attorney, Agent, or Firm—Donald J. Harrington; Keith L. Zerschling

[57] ABSTRACT

A rack and pinion steering gear mechanism for use with the dirigible wheels of a road vehicle comprising a steering gear pinion adapted to be connected to a vehicle steering linkage, a power rack engageable with the pinion and adapted for reciprocating linear motion, said rack including a power piston mounted within a power cylinder which define a pair of opposed pressure chambers, a steering shaft connected yieldably to the pinion by a torsion shaft, fluid pressure control valve means including relatively displaceable parts forming in part fluid connections between a pressure source and each of said pressure chambers, one valve part being connected to the pinion and the other part being connected to the steering shaft whereby distribution of working pressure to the pressure chambers is dependent upon the direction of torque applied to the steering shaft, the magnitude of the pressure buildup in the pressure chambers being proportional to the degree of displacement of the steering shaft relative to the pinion, the pressure chamber being defined by a cylinder and a piston carried by the rack within the cylinder and the pressure passages communicating with the pressure chamber being defined by an outer sleeve surrounding the cylinder and an inner sleeve within the cylinder, the bearing for the rack at the outboard end of the cylinder and the inboard end of the inner sleeve permitting articulation and misalignment with respect to the cylinder.

4 Claims, 7 Drawing Figures

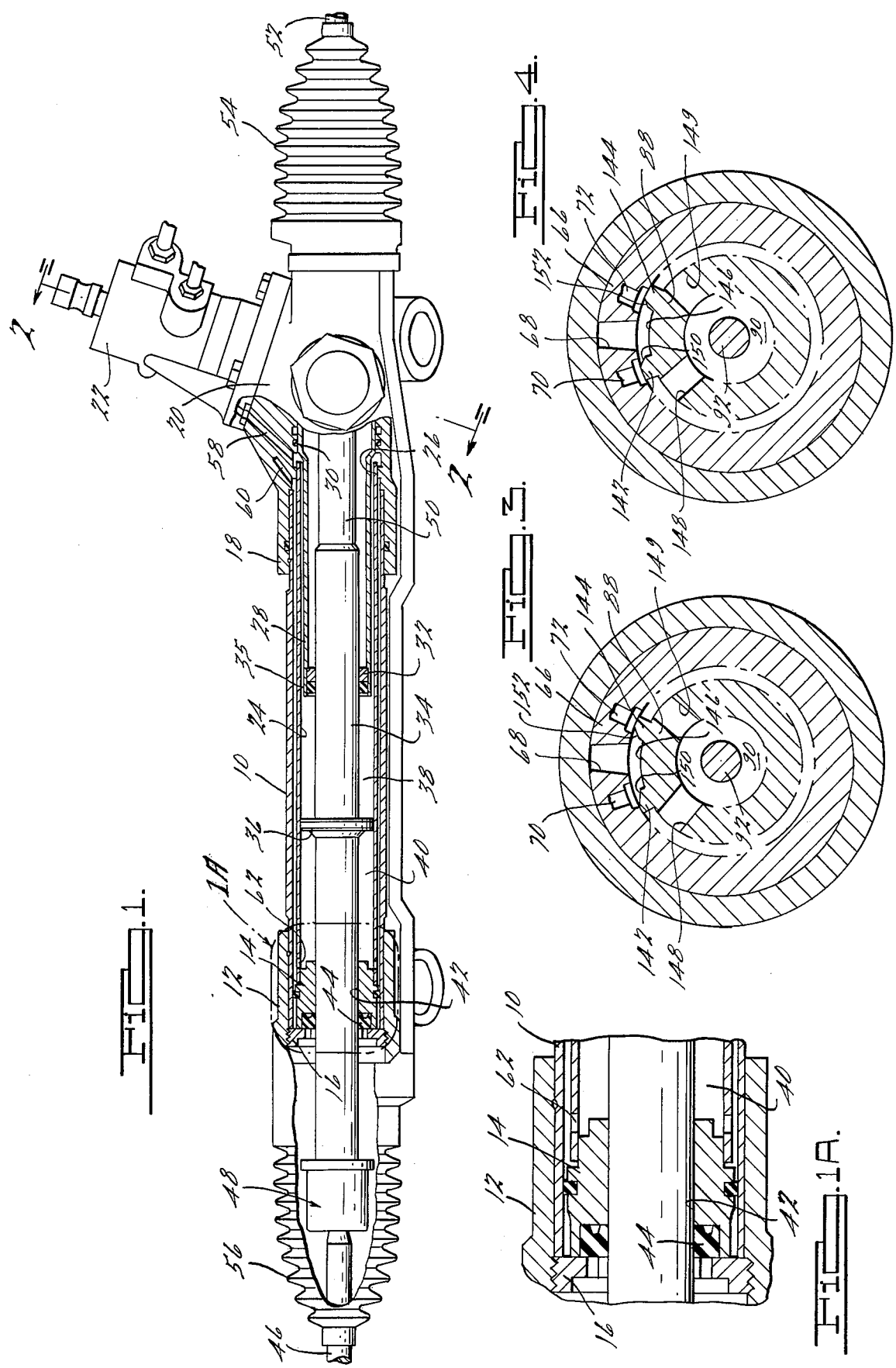

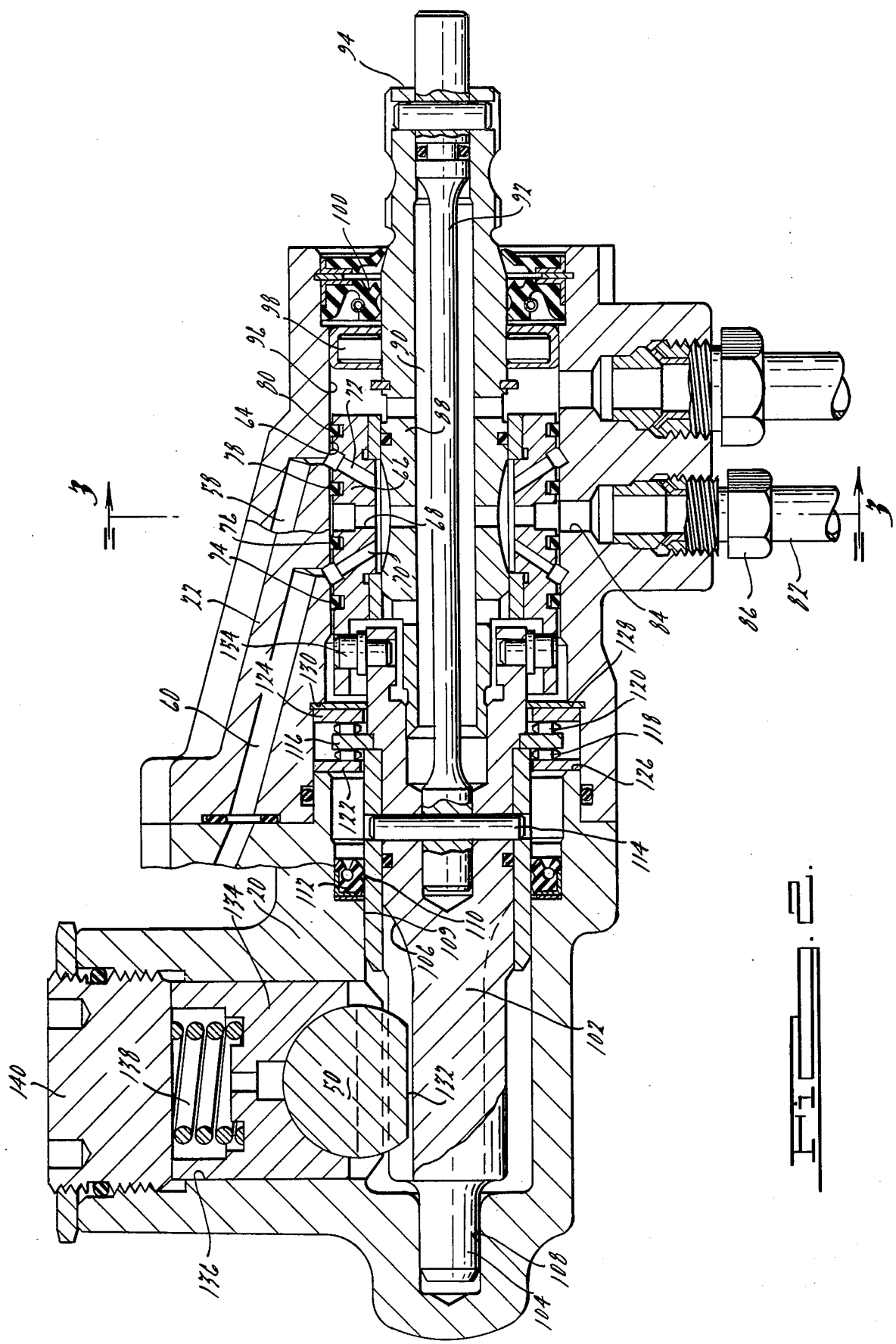

4,063,490

RACK AND PINION POWER STEERING GEAR MECHANISM

CROSS REFERENCE TO RELATED APPLICATION

This application is a continuation-in-part of co-pending application Ser. No. 505,884, filed Sept. 13, 1974, and now abandoned, and having the same title as the present application.

GENERAL DESCRIPTION OF THE INVENTION

My invention comprises an improvement in rack and pinion steering gears of the type presently used in automotive vehicles. Typical rack and pinion steering mechanisms are described in U.S. Pat. Nos. 3,709,099 and 3,707,167. Each employs a rotary valve having relatively displaceable rotary valve parts, one of which is connected to a steering shaft and the other which is connected to a steering linkage drive pinion. A yieldable torsion bar connection is provided between the steering shaft and the pinion so that upon application of steering torque to the steering shaft, relative displacement occurs between the rotary valve elements thereby introducing a pressure control function. The control valves form a fluid delivery path between a pump driven by the vehicle engine and the pressure chambers located on either side of the power piston which moves linearly within a cooperating power steering cylinder. The pressure chambers are in fluid communication with the control valves. That communication is established in my improved design by concentric sleeves assembled within and surrounding the power cylinder thereby eliminating the necessity for providing external fluid conduits as in conventional designs that form a part of the prior art. The valves are in fluid communication with the annular fluid passages through internal porting formed in a valve housing with rotary valve elements.

A movable rack integrated with the piston in the power cylinder is received slidably within a first sliding bearing and seal assembly at the outboard end of the cylinder remote from the valve. The inboard end of the rack is received within an articulated seal assembly carried by an inner sleeve that forms a part of one of the annular pressure distribution passages for the pressure chambers. The inboard end of that inner sleeve in turn is joined to the valve housing with an articulated connection and with a fluid seal that permits slight angular adjustment of the sleeve and the rack with respect to the centerline of the cylinder. This compensates for any slight angular misalignment of the centerline of the cylinder with respect to the geometric centerline of the rack.

The bearing and seal assembly at the outboard end of the power cylinder has a clearance with respect to the inside diameter of the cylinder to accommodate relative articulation and misalignment with respect to the cylinder. The rack slides within the bearing and seal assembly with a sliding fit.

The seal at the inboard end of the rack is piloted on the rack itself rather than on a fixed portion of the power cylinder assembly as in prior art constructions. This permits the seal to maintain a fluid-tight relationship of the pressure chambers regardless of slight manufacturing tolerances and clearances that would result in stray motion of the rack and slight eccentricities of the rack with respect to the cylinder.

A rotary valve assembly for controlling pressure distribution to the working chambers includes an outer valve sleeve joined in fixed relationship with respect to the steering pinion. In order to maintain accurate relative movement of one valve member with respect to the other, it is necessary to maintain precisely the axial position of the outer valve sleeve and the pinion with respect to the valve housing. This is accomplished in my improved design by a zero tolerance thrust bearing assembly for the pinion. This avoids a so-called stray motion of the valve and steering shaft with respect to the rack due to lost motion of the valve element caused by wear of the engaging rack and pinion tooth portions and other relatively movable parts of the assembly.

Controlled clearances are provided between the rack and the backup retainer walls for each of the seals for the rack thereby preventing scoring of the rack when the rack deflects laterally due to steering loads. Notwithstanding any rack deflection, the inner seal for the rack, since it is piloted on the rack itself, maintains an effective sealing relationship with respect to the moving rack thus preventing the leakage that is a common problem in prior art construction.

BRIEF DESCRIPTION OF THE FIGURES OF THE DRAWINGS

FIG. 1 shows in partial longitudinal cross section a rack and pinion power steering assembly capable of embodying the improvements of my invention.

FIG. 1A shows an enlargement of the outboard bearing and seal assembly of the structure shown in FIG. 1.

FIG. 2 is a cross sectional view taken along the plane of section line 2—2 of FIG. 1.

FIG. 3 is a cross sectional view taken along the plane of section line 3—3 of FIG. 2. It shows a rotary valve of the FIG. 2 construction in the left-turn position.

FIG. 4 is a view corresponding to the cross sectional view of FIG. 3 with the rotary valve part shown in the right-turn position.

PARTICULAR DESCRIPTION OF THE INVENTION

Figure 5:
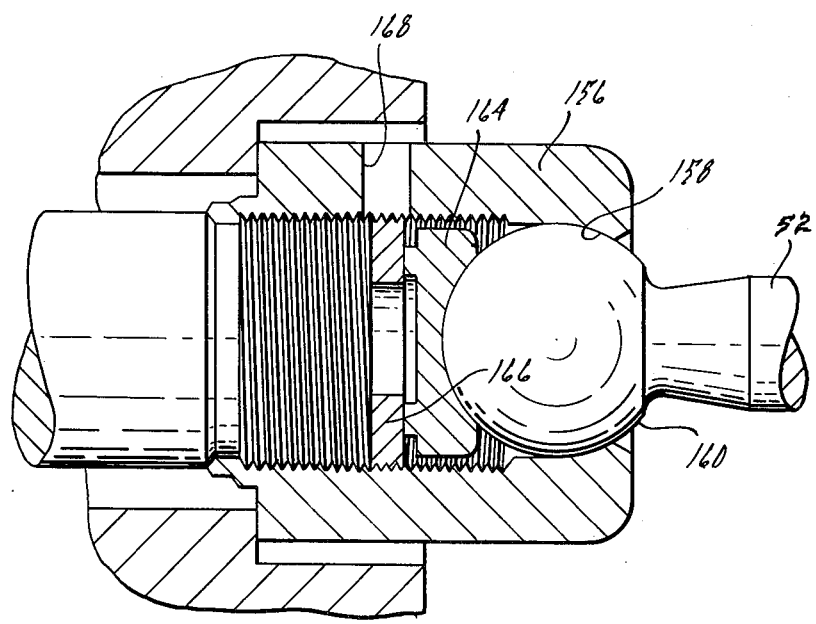
FIG. 5 shows in partial cross sectional form an inner ball joint connection between the power rack and pinion assembly of FIG. 1 and the associated tie rod for the vehicle steering linkage.

In FIG. 1 reference character 10 identifies a power cylinder sleeve. Located at the left-hand end of cylinder sleeve 10 is a remote end housing 12 with a central opening within which one end of the cylinder sleeve 10 is received. An end bushing 14 is received within the left end of the cylinder sleeve 10 and it is held in place by an externally threaded lock nut 16 received within a threaded end of the housing 12. This is seen more clearly in the enlarged view of FIG. 1A.

The right-hand end of the cylinder sleeve 10 is received within and fixed to a sleeve 18 of an end housing 20. Valve housing 22 is secured to the housing 20. It contains a rotary valve structure which will be described with reference to FIG. 2.

A power cylinder 24 is positioned within cylinder sleeve 10. The left-hand end of pressure cylinder 24 registers with the bushing 14 with a close, movable fit and is supported by it. A clearance is provided between the end of cylinder 24 and the adjacent shoulder in the bushing 14. A clearance is provided also between the lock nut 16 and the left face of the bushing as viewed in FIGS. 1 and 1A. The right-hand end of power cylinder 24 is supported by internal shoulder 26 formed in sleeve 18 of the housing 20. A second inner sleeve 28 is received within the right-hand end of cylinder 24 and its right-hand end is positioned within and is supported by internal shoulder 30 also formed in the sleeve 18 of the housing 20. The right-hand end of the sleeve 28 is adapted to accommodate a slight swivel or articulation with respect to the shoulder 30, sufficient clearance being provided for that purpose between the sleeve outside diameter and the shoulder. A seal ring surrounds the sleeve 28 at the shoulder location. The left-hand end of the cylinder 28 has secured therein a seal and bushing assembly 32 wherein the bushing portion 32 acts as a backup ring for the seal portion 35; which surrounds a piston rod in the form of gear rack 34. The power rack fluid seal 35 is positioned against the ring 32 to isolate the annular chamber between the sleeve 28 and the power rack from the pressurized interior of the sleeve 24.

Figure 6:
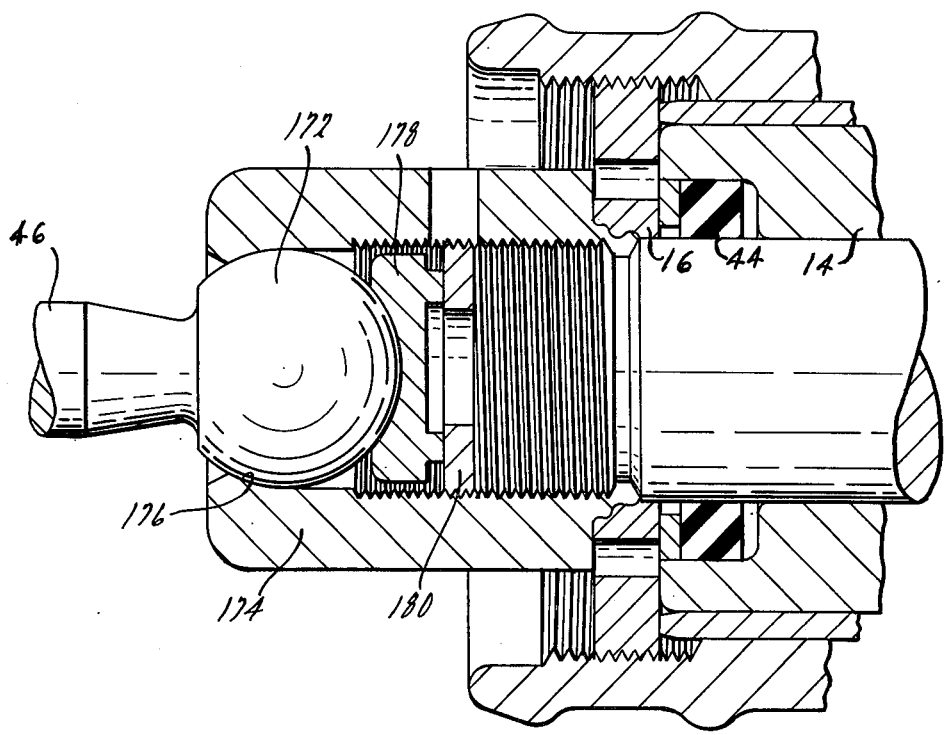
FIG. 6 shows in partial cross sectional form the inner ball joint connection between the remote end of the power rack and the associated tie rod member of the steering linkage for the vehicle.

Rack 34 has formed thereon a power piston 36 which is secured to the rack 34 at an intermediate location. It is received slidably within the cylinder 24 and cooperates therewith to define a pair of opposed pressure working chambers 38 and 40. The left-hand end of the rack 34 is slidably received within opening 42 in the bushing 14. A fluid seal 44 is situated between the bushing 14 and the lock nut 16 thereby sealing the piston rod portion 34 and preventing leakage of pressurized fluid from the working chamber 40 to the exterior of the power cylinder 10. A steering linkage tie rod 46 is joined to the end of the piston rod portion 34 of the power rack by means of a ball joint connection 48, which will be described with reference to FIG. 6.

The right-hand end of the rack 34 is formed with rack teeth at the rack portion 50. The rack portion 50 extends from the right-hand end of the housing 20 and is joined to another tie rod 52 of the vehicle steering linkage. A flexible protective boot 54 surrounds the tie rod 52 at one end thereof and the adjacent end of the housing 20. At the other end of the rack 34 a corresponding flexible protective boot 56 surrounds the tie rod 46 and the adjacent end housing 12. Rack portion 50 is connected to tie rod 52 by means of a ball joint connection which will be described with reference to FIG. 5.

Pressure chamber 38 is pressurized to effect a right-hand turn of the vehicle. It is in fluid communication with the annular passage situated between the cylinder 24 and the inner sleeve 28. That annular passage communicates also with pressure passage 58 located in the housing 20. A corresponding pressure passage 60 in the housing 20 communicates with the annular fluid passage defined by the concentric cylinder sleeve 10 and cylinder 24. That annular passageway communicates with the pressure chamber 40 through radial pressure ports 62.

Chamber 40 is pressurized during left-hand turning maneuvers of the steering assembly. Pressure is distributed to passages 58 and 60 and is exhausted selectively therefrom in response to actuation of the rotary valve assembly which will be described with reference to FIGS. 3 and 4 as well as FIG. 2. The concentric sleeves 28 and 24 in power cylinder 10 define internal fluid conduits which eliminate the need for external conduits found in conventional power steering systems having rack and pinion gear assemblies. The inner seal and bushing shown at 35 and 32, respectively, are piloted on the piston rod portion 34 of the rack assembly thereby allowing for slight articulation of the power rack with respect to the center line of the cylinder 10. Sufficient clearance between the bushing outside diameter and the inside diameter of the sleeve 24 is provided to accommodate misalignment of portion 34 and sleeve 24. Sufficient clearance is provided between the bushing 14 and cylinder sleeve 10 to permit slight articulation to occur. Thus, normal manufacturing tolerances in the locations of the center lines of the rack assembly with respect to the bushings and the power cylinder 10 do not cause errors in the operation of the rack assembly. It also eliminates the leakage that normally would be present in the absence of the ability of the moving parts to articulate in this manner. It then is possible to maintain closer tolerances between the bushing 32 and the piston rod portion 34 when the former is piloted on the latter rather than on a fixed support within a fixed housing as is the case in prior art steering systems.

Pressure distribution to the passages 58 and 60 is effected by the rotary valve assembly shown in part in longitudinal cross section in FIG. 2 and in transverse cross section in FIGS. 3 and 4. The valve housing 22 is formed with an internal cylindrical valve cavity 64. A rotary valve sleeve 66 positioned within cavity 64 is provided with radial pressure supply ports 68 and pressure distribution ports 70 and 72 which communicate respectively with left turn pressure passage 60 and right turn pressure passage 58. The pressures in passage 60 and in port 70 are isolated, one with respect to the other, by ring seals 74 and 76 which surround the cylindrical valve element 66 corresponding to ring seals 78 and 80 surrounding valve element 66 thereby isolating the pressure in port 72 and passage 58. Seals 76 and 78 are also effective to isolate pressure in pressure supply ports 68, the latter communicating with fluid pressure inlet conduit 82 through port 84 in housing 22. A fluid fitting 86 provides a fluid tight connection between the conduit 82 and port 84.

Valve element 66 has a cylindrical internal cavity within which is positioned internal rotary valve element 88. This valve element and its mode of cooperation with valve element 66 will be described now with reference to FIG. 3 and FIG. 4.

Valve element 88 is formed with an internal cavity 90 through which a torsion rod 92 extends. The right-hand end of the valve element 88 defines a steering shaft 94, shown in FIG. 2, which is splined or otherwise connected suitably to a driver operated steering shaft and journalled within bearing opening 96 in housing 22 by means of a steering shaft bearing 98. Fluid seal 100 surrounds steering shaft 92 and is held in place by a snap ring as indicated.

The right-hand end of the torsion rod 92 is pinned securely to the right-hand end of steering shaft 94. The left-hand end of the torsion rod 92 is pinned at 114 or otherwise securely connected to a drive pinion 102 journalled within housing 20. The pinion 102 is formed with end bearing portion 104 and an intermediate bearing portion 106. Bearing portion 104 is journalled within bearing opening 108 in the housing 20 and bearing portion 106 is journalled within bearing opening 109 at the opposite end of the housing 20.

Pinion 102 forms a part of an assembly that includes a sleeve 110 about which is positioned pinion seal 112. The end of the sleeve 110, which in the embodiment of FIG. 2 is secured by pin 114 to the pinion 102 and the left-hand end of the torsion rod 92 engages thrust washer reaction ring 116 located on either side of the reaction ring 116. Radial needle bearings 118 and 120 engage, respectively, thrust washers 122 and 124. Washer 122 is fixed in abutting relationship with respect to the end 126 of the housing 20. A Belleville thrust washer 128 is located between reaction ring 124 and an adjacent shoulder 130 formed in the interior valve opening of the housing 22. The preload on the Belleville washer 128 is sufficient to maintain the pinion 102 in fixed axial disposition with respect to the housing 20. Pinion 102 engages rack teeth 132 formed on the rack 50.

The pinion 102 may be formed with teeth with a helical lead angle. When torque is applied to the pinion 102, the resulting axial thrust in either one direction or the other thus is absorbed by the thrust bearing assembly shown at 116, 118 and 120. The preload on the Belleville spring 128 is sufficient to prevent axial displacement of the pinion 102 relative to the housing 20 for any design torque to which the pinion 102 may be subjected. The teeth 132 of the rack 50 are held in preloaded, zero-backlash engagement by a preload plunger 134 slidably situated in cylindrical opening 136 in housing 20. Preload force is applied to the plunger 134 by compression spring 138 which is seated on enclosure 140 threadably received within the end of the opening 136.

In FIG. 3 I have illustrated a cross sectional view of the rotary valve elements 66 and 68. Inner valve element 88 is formed with first valve lands 142 which register with valve ports 70. Corresponding valve lands 144 formed on the valve element 88 register with valve ports 72. The regions 146 located between the valve lands 142 and 144 are in fluid communication with pressure inlet ports 68. Radial outlet pressure ports 148 and 150 are formed in the valve element 88 thereby establishing fluid communication between the interior opening 90 of the valve element 88 and the annular exhaust region between the two concentric valve elements 88 and 66. There are several other pairs of pressure ports in valve lands in the rotary valve assembly, but these duplicate the ones illustrated specifically in FIG. 3. They therefore need not be described.

A calibrated chamber 150 is formed on one edge of each valve land 142 and a corresponding calibrated chamber 152 is formed on the other valve lands 144. Valve lands 142 and 144 act in pairs so that as the valve element 88 is rotated in a counterclockwise direction relative to valve element 66 as seen in FIG. 3, parts 68 are brought into fluid communication with passage 70 and communicate between ports 68 and passage 72 is restricted. Conversely, communication between the internal exhaust passage 70 is decreased as communication between the passage 72 and the internal exhaust region is increased. This latter condition results in an increase in the pressure in left turn pressure chamber 40 and a decrease in the pressure in right turn pressure chamber 38.

Relative rotation of one valve element with respect to the other occurs as steering torque is applied to the steering shaft 94. Torque applied by the operator to the shaft 94 is transmitted to the pinion 102 through the torsion rod 92. The torsion rod 92 will yield linearly as the torque is increased. Yielding of the torsion rod results in relative displacement of the valve elements 66 and 88. As torque is applied in a left turn direction, the valve elements assume the position shown in FIG. 3. As torque is applied in the opposite direction, the valve elements are conditioned for a right turn maneuver and the valve elements assume the position shown in FIG. 4. Valve element 66 is joined to and rotates with pinion 102 by reason of a fixed connection therebetween provided by drive pin 154.

The remote end of the piston rod has threadably connected thereto a tie rod coupling member 156 which is formed with a partial internal spherical surface 158. That surface registers with spherical surface 160 on one end of tie rod 52, the latter forming a part of the vehicle steering linkage. A spacer member 146 registers with the spherical end of the tie rod 52. It is held in place by a jam nut 166 threadably received within the internal threaded opening of the coupling member 156. After the tie rod member 52 and the rack are assembled, the margin of the man nut 166 is staked by inserting a staking tool through opening 168 in the member 156. This eliminates the need for providing a pin thereby simplifying the assembly.

A corresponding connection provided at the other end of the rack for tie rod 46 includes a spherical tie rod end 172 received within coupling member 174. A partial conical internal surface 176 in member 174 registers with the spherical tie rod end. A spacer 178 having a concave surface that registers with the tie rod end is held in place by jam nut 180 threadably received within the member 174.

Having thus described a preferred embodiment of my invention, what I claim and desire to secure by U.S. Letters Patent is:

1. A power rack and pinion assembly for a vehicle steering linkage comprising a power cylinder, a power piston rod positioned within said power cylinder, a piston carried on said piston rod and defining on either side thereof opposed pressure chambers in said power cylinder, an inner sleeve concentrically disposed within said power cylinder, an outer sleeve surrounding said power cylinder and defining therebetween an annular pressure passage, a steering gear housing supporting one end of said power cylinder and one end of said inner sleeve, an annular bushing supported at the other end of said power cylinder, means mounting said bushing for radial movement relative to said outer sleeve, means mounting said bushing for axial movement relative to said power cylinder, said piston rod slidably registering with the opening in said bushing thereby providing a first support bearing point, a seal and bushing assembly at the other end of said inner sleeve in the interior of said power cylinder, said seal and bushing assembly being piloted on said piston rod and having a radial clearance relative to said power cylinder, means mounting said one end of said inner sleeve on said housing for angular movement relative thereto whereby slight tolerances and misalignments of the center lines of said piston rod and said inner sleeve may be accommodated while maintaining uniform sliding bearing contact for said bushing and said seal and bushing assembly with said piston rod, said steering gear housing including a pair of pressure passages, one pressure chamber on one side of said piston communicating with one pressure passage through said annular pressure passage and the other passage communicating with the other pressure chamber on the other side of said piston through the annular space defined by said inner sleeve and said power cylinder, a rotatable steering shaft journalled in said housing, a pressure port and an exhaust port in said housing, valve means in said housing responsive to movement of said steering shaft for controlling distribution of pressure from said pressure port to either of said pressure passages and for controlling communication between said pressure passages and said exhaust port.

2. The combination as set forth in claim 1 wherein said piston rod comprises a rack, said steering assembly including a pinion connected to said valve means and engageable with said rack whereby rotary movements of said steering shaft effect reciprocating movement of said rack.

3. The combination as set forth in claim 2 wherein said valve means includes a pair of relatively displaceable elements, one of which is connected to said steering shaft and the other of which is connected to said pinion, and a yieldable connection between said valve elements whereby the displacement of one valve element with respect to the other is linearly proportional to torque applied to the steering shaft.

4. The combination as set forth in claim 2 wherein said valve means comprising a first rotary valve element, a second rotary valve element registering with said first valve element and located in concentric disposition with respect to it, one valve element being connected to said steering shaft and the other being connected to said pinion and a torsion rod connection between said pinion and said steering shaft whereby mechanical forces transmitted between said steering shaft and said pinion cause deflection of said torsion rod and angular displacement of one valve element with respect to the other.

* * * * *